(12) United States Patent  (10) Patent No.: US 8,727,222 B1
Picard et al.  (45) Date of Patent: *May 20, 2014

(54) METHOD AND DEVICE FOR AUTHENTICATING GEOMETRICAL CODES

(71) Applicant: Advanced Track and Trace, Rueil-Malmaison Cedex (FR)

(72) Inventors: Justin Picard, Rueil-Malmaison Cedex (FR); Zbigniew Sagan, Rueil-Malmaison Cedex (FR); Alain Foucou, Rueil-Malmaison Cedex (FR); Jean-Pierre Massicot, Rueil-Malmaison Cedex (FR)

(73) Assignee: Advanced Track and Trace, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,441

(22) Filed: Apr. 30, 2013

Related U.S. Application Data

(62) Division of application No. 13/120,502, filed as application No. PCT/FR2009/001096 on Sep. 15, 2009, now Pat. No. 8,448,865.

(30) Foreign Application Priority Data

Sep. 23, 2008 (FR) ...................... 08 05214
Nov. 27, 2008 (FR) ...................... 08 06673

(51) Int. Cl.
*G06K 7/00* (2006.01)

(52) U.S. Cl.
USPC .................................................. 235/462.04

(58) Field of Classification Search
USPC .................................................. 235/462.04
See application file for complete search history.

(56) References Cited

U.S. PATENT DOCUMENTS 8,448,865 B2 * 5/2013 Picard et al. ............. 235/462.04
2008/0110990 A1 5/2008 Cordery et al.

FOREIGN PATENT DOCUMENTS

WO 2008/003964 1/2008
WO WO 2008003964 A2 * 1/2008

* cited by examiner

*Primary Examiner* — Kristy A Haupt
(74) *Attorney, Agent, or Firm* — Young & Thompson

(57) ABSTRACT

The method for authenticating a code with geometric areas whose shapes and/or colors vary according to a message includes:
  a step (115) in which the code with variable geometric areas is generated, according to a message, to provide geometric areas;
  a step (120 to 130) in which a digital authentication code is generated to provide numeric values and
  a step (135) in which an image of the geometric code areas is formed, including a part of the digital authentication code in at least some of its geometric areas and/or in at least one space between geometric areas.

20 Claims, 10 Drawing Sheets

180

180

METHOD AND DEVICE FOR AUTHENTICATING GEOMETRICAL CODES

CROSS REFERENCE TO RELATED APPLICATIONS

This application is a divisional of co-pending application Ser. No. 13/120,502, filed on Mar. 23, 2011, which is the national phase of PCT International Application No. PCT/FR2009/001096 filed on Sep. 15, 2009 under 35 U.S.C. §371, which also claims the benefit of French Patent Application No's. 08/05214 filed in France on Sep. 23, 2008 and 08/06673 filed in France on Nov. 27, 2008. The entire contents of each of the above-identified applications are hereby incorporated by reference.

FIELD OF THE INVENTION

The present invention concerns a method and device for authenticating geometric codes. It is applicable in particular to one-dimensional (called "1D"), two-dimensional (called "2D") and even three-dimensional ("3D") barcodes and Data Matrix (registered trademark).

BACKGROUND OF THE INVENTION

The Data Matrix code is a high-density two-dimensional barcode symbology that allows a large amount of information, up to 2,335 alphanumeric characters or 3,116 numeric characters, to be represented in a small area of about 1 cm$^2$. The Data Matrix code is in the public domain. The Data Matrix is in the form of a matrix of juxtaposed dots or squares.

The Data Matrix code complies with the ISO IEC16022 standard. Under this standard, the Data Matrix symbol can contain various levels of robustness, known as Error Checking and Correction or "ECC", allowing it to be read even when partially degraded or obscured. The standard allows several variants of the Data Matrix, from ECC000 that offers no robustness if the symbol is degraded, such as 1D barcodes (EAN 13, etc.) to ECC200 offering the highest level of security (a symbol remains legible with up to about 20%).

The main area of application of Data Matrix is for marking very small mechanical or electronic members. It is used, among others, by NASA ("National Aeronautics and Space Administration") for marking each of the component members of the space shuttles. In typical applications, it is used for postage in some countries, such as Switzerland, and more recently for some mobile applications, where it is often called a "Tag" (or label). Flashcode (registered trademark) is a proprietary commercial implementation using the Data Matrix standard.

The Data Matrix ECC200 is among the standards adopted by GS1 (acronym for "Global Standard") and a recent opinion of the AFSSAPS (acronym for "Agence Francaise de Securite Sanitaire des Produits de Sante"—the French Health Products Safety Agency) indicates that, by January 2011, all medicines subject to an authorization to market will comprise, in addition to current legal mentions, a 2D Data Matrix code containing a number of predefined pieces of information.

The Data Matrix was designed to maximize the amount of data that can be stored in image form, such that the decoding machines, or readers, of this data (based on a captured image) are fast and reliable. It has not, however, been designed to secure the stored data, just as this problem arises more and more.

Thus, Data Matrix decoding is performed according to an open standard, and does not incorporate any cryptographic key to encrypt and/or apply a digital signature to the data. The stored message data, however, can be encrypted or digitally signed before being modulated to form the Data Matrix. Thus, the source and integrity of a message can be guaranteed, without the possibility for anyone to falsify a legitimate message (i.e. change its content) or to pretend to be the author of a legitimate message.

However, cryptographic techniques offer no protection against exact duplication or "cloning" of Data Matrix data. In many anti-counterfeiting applications, however, protection against these exact duplicates is essential, because counterfeiters can easily make a perfect copy of a document, packaging or other object comprising a Data Matrix if it does not contain any copy protection elements. Some track and trace applications allow the products to be tracked through the entire supply chain using the identifier contained in the Data Matrix: in this way, they can determine the presence of duplicates if an identifier is found more than once, or identify anomalies in the distribution if the identifier points to a product that should be elsewhere in the supply chain.

It is certain that unitary traceability at all levels of the supply chain is an aid in combating counterfeiting even if, in the end, it does not make it possible to determine which of two apparently identical products is the original. However, in most cases, such a traceability system is too costly or simply impossible to implement, because it must be centralized so that two products with the same Data Matrix found in two different locations can be identified as such.

This is why rights holders who use Data Matrix often use other means to ensure the authenticity of a document or product. For example, several solutions are based on secure labels, which combine an authenticator such as a hologram or OVD (acronym for "Optically Variable Device") positioned close to the Data Matrix. Unfortunately, the means used are generally expensive and inefficient. Expensive, in that many authentication technologies require advanced technology for the construction of optical effects. Inefficient, in that increasingly, the optical effects can be mimicked with sufficient accuracy at low cost. Furthermore, these effects do not provide intrinsic protection of the identifier. For example, if a set of documents containing the authentication means is stolen, arbitrary Data Matrix codes can be applied to it.

The Data Matrix can be "secured" against copying by marking, for example, with special inks. However, counterfeiters are able to obtain special inks more and more easily, and this solution is not truly secure, while remaining costly. For many applications, therefore, the Data Matrix codes are applied by laser ablation.

Document US 2008/0252066 proposes to print multi-color 2D barcodes, whose reading and/or authentication requires the printed code to be illuminated by different light sources and/or spectral filters. Unfortunately, the use of multiple inks is both costly and complex to produce, and requires specialized image capture means for detection, which limits the authentication possibilities. In addition, such an approach does not offer high security against a determined opponent who can easily find the types of inks used, and determine the printed codes with the appropriate spectral lighting.

Document US 2008/110990 proposes applying a rotation to the print head, the effect of which can subsequently be detected and measured on the basis of a captured image of a printed barcode. However, the document implicitly acknowledges that the method it describes can only detect copies made with a printing means that does not allow print head rotation. Thus, this invention does not offer real protection against counterfeits made with the same printing means, and is restrictive in that it requires the use of a particular print medium, greatly limiting its use.

Document WO 2008/003964 proposes methods for introducing a second level of information in 1D and 2D barcodes by varying information-bearing elements such that they represent the second level of information, e.g. by enlarging or reducing the cell size of a Data Matrix, or by cropping or not cropping the extremities of its black cells. This approach solves some of the shortcomings of the prior art, because the second level of information, which can be used for authentication, is inserted at the time of printing; this is convenient and inexpensive. It is secure in regards to counterfeiters who are not aware of this method and who only duplicate the barcode by reproducing the first-level information. The second level can, however, be easily copied exactly by a counterfeiter who is aware of its presence. Besides, that document states that the second information level can be copied by high-quality printing means, even though copy-proofing properties are maximized (see page 12, lines 9-12 of that document).

SUMMARY OF THE INVENTION

The aim of the present invention is to remedy these drawbacks. In particular, it relates to methods allowing a second level of information to be included using the same printing method as that used for printing the barcode; contrary to the conclusions of the document cited above, this second level of information is physically and mathematically impossible to copy.

To this end, according to a first aspect, the present invention envisages a method for authenticating a code with geometric areas whose shapes and/or colors vary according to a message, characterized in that it comprises:
- a step in which said code with variable geometric areas is generated, according to a message, to provide geometric areas;
- a step in which a digital authentication code is generated to provide numeric values and
- a step in which an image of said geometric code areas is formed, comprising a part of said digital authentication code in at least some of its geometric areas and/or in at least one space between geometric areas.

Thus, the present invention allows a 2D barcode to be authenticated directly by purely digital means, on the basis of an image thereof, while leaving this 2D barcode legible.

It is recalled here that the digital authentication codes, also called "DAC" below, are digital images that, once marked onto a medium, for example by printing or local modification of the medium, bear characteristics that are generally measurable automatically from a captured image and are modified when copied. The digital authentication codes are generally based on the degradation of at least one copy-sensitive signal, such a signal being borne by image elements with measurable characteristics that are copy-sensitive.

Thus, a geometric area comprising a part of the digital authentication code has a variable marking characteristic designed to be generally degraded when said geometric area is copied.

Certain types of digital authentication codes can also contain an item of information allowing the document containing it to be identified or tracked. DACs are extremely advantageous for copy detection. Indeed, they are extremely inexpensive to produce, very easy to incorporate, and can be read by a machine having image capture means, while being able to provide a high level of security against copying. Thanks to the implementation of the present invention, a code with geometric areas, for example bars, is inextricably linked to a DAC.

It can be seen that the present invention has advantages over the simple juxtaposition of a code with geometric areas and a DAC. Firstly, this latter approach would involve printing two codes onto the document at different times, which would consume space and make the method of producing secure documents more complex. Secondly, authentication would require capturing two images, one of the DAC and the other of the code with geometric areas, making the reading method less convenient. Finally, a counterfeiter who successfully obtains a number of documents bearing the DAC before the Data Matrix is printed, or manages to obtain the printing plate or a file containing the original DAC would be able to generate "genuine" documents by cloning authentic Data Matrix codes associated with the DAC.

It can be seen that the image formation step may comprise, for example, printing, material ablation, solid transfer or a local physical or chemical change, for example, by being subjected to heat.

According to particular features, because of physical uncertainties inherent to image formation, the image formation step assigns an error rate to the representation of the digital authentication code which is higher than a first predefined value and lower than a second predefined value.

It is recalled here that digital authentication codes ("DAC") are composed of various elements that take discrete values. In the case of binary values, the elements can be represented by a black (printed) or white (not printed) cell. At the time of detection, an error rate that corresponds to the rate of cells containing an incorrect value is determined It is noted that the error rate is directly related to the ratio of signal energy to noise energy.

For example, the first predefined value is 10% and the second predefined value is 35%.

According to particular features, because of physical uncertainties inherent to image formation, the image formation step, between two formations of a same code with variable geometric areas, assigns a variation to the digital authentication code's representation which is higher than a third predefined value and lower than a fourth predefined value.

For example, the third predefined value is 2% and the fourth predefined value is 45%.

According to particular features, because of physical uncertainties inherent to image formation, the image formation step assigns a noise to the representation of the digital authentication code, such that the signal to noise ratio of the digital authentication code's representation is lower than a fifth predefined value.

According to particular features, because of physical uncertainties inherent to image formation, the image formation step assigns a noise to the representation of the digital authentication code, such that the signal to noise ratio of the digital authentication code's representation is higher than a sixth predefined value.

For example, the fifth predefined value of the signal to noise ratio is 0.05 and the sixth predefined value is 2.63, resulting in a copy detection performance of at least 25% of the optimal copy detection performance (obtained with a value of 0.56).

For example, the fifth predefined value of the signal to noise ratio is 0.11 and the sixth predefined value is 1.8, resulting in a copy detection performance of at least 75% of the optimal copy detection performance (obtained with a value of 0.56).

For example, the fifth predefined value of the signal to noise ratio is 0.32 and the sixth predefined value is 0.93, resulting in a copy detection performance of at least 90% of the optimal copy detection performance (obtained with a value of 0.56).

According to particular features, the method that is the subject of the present invention, as described in brief above, comprises in addition:
- a step in which the conditions for forming said image are determined and
- a step in which the physical characteristics of cells of at least a part of the digital authentication code is determined, depending on the image formation conditions.

According to particular features, during the step of generating said code with variable geometric areas, the variable geometric areas are generally parallel rectangular bars whose width and/or spacing varies according to said message.

Thus, the present invention applies to one-dimensional barcodes.

According to particular features, during the step of generating said code with variable geometric areas, the variable geometric areas are square areas inserted into a matrix whose color and/or at least one dimension vary according to said message.

Thus, the present invention applies to two-dimensional barcodes.

According to particular features, during the image formation step of said code with geometric areas comprising, in at least some of its geometric areas, a part of said digital authentication code, the digital authentication code takes the form of a variation of at least one dimension of the variable geometric areas.

According to particular features, during the image formation step of said code with geometric areas comprising, in at least some of its geometric areas, a part of said digital authentication code, each part of the digital authentication code inserted into a geometric area of the code with variable geometric areas takes the form of a distribution of rectangular cells at least one order of magnitude smaller than the dimensions of said geometric area, a part of said cells having a color different from that of said geometric area.

According to particular features in each geometric area comprising a part of the digital authentication code, the area of said cells is less than a quarter of the area of said geometric area.

According to particular features, the method that is the subject of the present invention, as described in brief above, comprises in addition, a step in which information is encoded into said digital authentication code.

According to particular features, said information is based on said message and/or said message is based on said information.

Authentication is thus strengthened as it is not possible to modify the message without modifying the information carried by the DAC and/or inversely.

According to particular features, said information is representative of a measurement of the degradation of the digital authentication code due to physical uncertainties that affect the image during the image formation step.

For example, the information is representative of an error rate of a signal to noise ratio due to the image formation step or of a correlation rate with an original digital authentication code. This information can represent an expected level of degradation or a level of degradation limit beyond which the code will be considered a copy. The authentication of the image can thus be performed autonomously, by a reader designed to capture an image of the digital authentication code inserted in the code with variable geometric areas since it indicates, through the information it carries, the normal level of degradation and, therefore, at what level of degradation, a captured image is a copy of the digital authentication code.

According to particular features, the method that is the subject of the present invention comprises in addition, a step in which the degradation of the digital authentication code generated during the image formation step is measured.

According to particular features, during the degradation measurement step, error detection codes embedded in said digital authentication code are used.

Said measurement or "score" is, for example, the percentage of bits correctly determined, a correlation coefficient between the original DAC and the DAC captured in an image captured by an image sensor.

According to particular features, the method that is the subject of the present invention, as described in brief above, comprises a step in which an imprint of the generated image is determined, said imprint being a function of a degradation of the digital authentication code during the image formation step.

The object or document bearing the code with variable geometric areas can thus be identified, i.e. recognized, even if the code with variable geometric areas and the digital authentication code are identical for a plurality of objects or documents.

According to a second aspect, the present invention envisages a device for authenticating a code with geometric areas whose shapes and/or colors vary according to a message, characterized in that it comprises:
- a means of generating said code with variable geometric areas, according to a message, designed to provide geometric areas,
- a means of generating a digital authentication code designed to provide numeric values and
- a means whereby an image of said geometric code areas is formed, comprising a part of said digital authentication code in at least some of its geometric areas and/or in at least one space between geometric areas.

According to a third aspect, the present invention envisages a method for authenticating a code with geometric areas whose shapes and/or colors vary, represented by a captured image, characterized in that it comprises:
- a step in which a message carried by the mean shapes and colors of the geometric areas is read,
- a step in which a level of degradation of a digital authentication code, represented in at least some of the geometric areas of said code with geometric areas, is measured and
- a step in which the authenticity of said code with geometric areas is determined, based on at least said level of degradation.

According to a fourth aspect, the present invention envisages a device for authenticating a code with geometric areas with shapes and/or colors, represented by a captured image, characterized in that it comprises:
- a means of reading a message carried by the mean shapes and colors of the geometric areas,
- a means of measuring a level of degradation of a digital authentication code, represented in at least some of the geometric areas of said code with geometric areas, and
- a means of determining the authenticity of said code with geometric areas designed to determine the authenticity of said code with variable geometric areas based on at least this level of degradation.

According to a fifth aspect, the present invention envisages a code with geometric areas whose shapes and/or colors vary according to a message, characterized in that it represents:

a message via the geometric areas and a digital authentication code, in at least some of its geometric areas, using a characteristic marking that varies depending on said digital authentication code.

As the advantages, aims and special features of these devices, of this method and of this code, which are the subject of the present invention, are similar to those of the authentication method, which is the subject of first aspect of the present invention, as described in brief above, they are not repeated here.

BRIEF DESCRIPTION OF THE DRAWINGS

Other advantages, aims and particular features of the present invention will become apparent from the description that will follow, made, as a non-limiting example, with reference to the drawings included in an appendix, in which.

DETAILED DESCRIPTION OF THE INVENTION

Figure 1A:
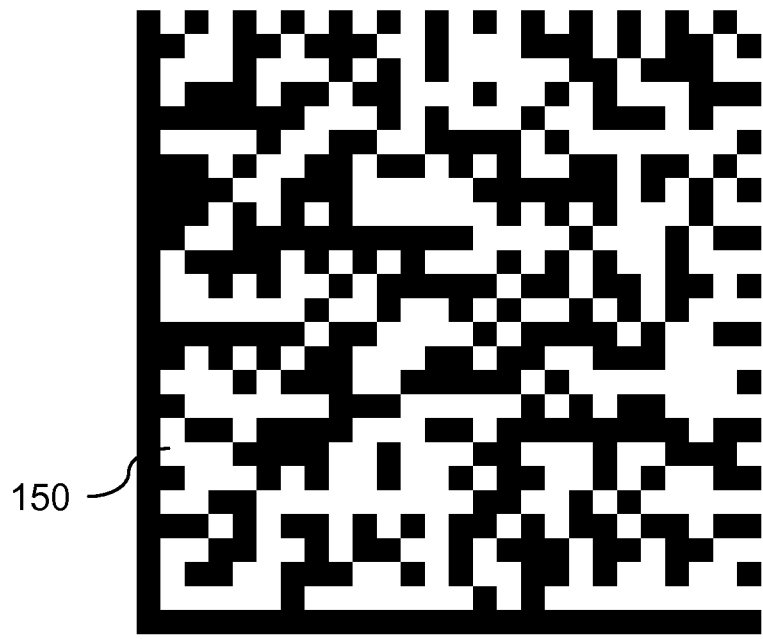
FIG. 1A shows a Data Matrix known in prior art.

Throughout the description, the terms "image formation" and "printing" are used to describe the formation of a marking that can be detected, for example by ink deposit, material ablation, solid transfer or a local physical or chemical change, for example, by being subjected to heat.

Although the following description is made for the case of two-dimensional barcodes, the present invention is not limited to this type of marking and printing on objects but applies, rather, to all types of marking and printing of codes with geometric areas whose shapes and/or colors vary depending on a message, in particular one- two- or three-dimensional barcodes formed on the objects' surface and markings below the objects' surface.

In the case of one-dimensional barcodes, the code's geometric areas are alternately white and black rectangular vertical bars whose widths vary according to the message carried by the code.

In the case of two-dimensional barcodes, the code's geometric areas are squares forming a regular grid whose color varies according to the message carried by the code.

In the remainder of the description, these geometric areas are referred to as "cells". Methods and devices to authenticate 2D barcodes (also called Data Matrix) directly are described in particular below and, more specifically, to authenticate 2D barcodes printed by incorporating a digital authentication code ("DAC"), marked by variable-power lasers, and fixed-power lasers.

Regarding the integration of a DAC into a 2D barcode, a method for generating a Data Matrix comprising an incorporated DAC is described below with reference to FIG. 4. It is noted that the recommended settings for generating the DAC, in particular the resolution in pixels per inch and the type of cell used (i.e. the shape and/or size of elements making up the DAC) have been determined beforehand for the printing method (paper, ink, printing machine, document), for example using a known method.

With respect to the method of determining optimal settings for image formation of the authenticating patterns, an optimal level of degradation exists that allows the various prints of a single source authenticating pattern to be separated as easily as possible. Thus, if the level of degradation on printing is very low, for example 1% or 2% (1 or 2% of the identifier pattern's cells or pixels are misread from a perfect capture), the various prints of a single identifier pattern are very close to each other and it is difficult to identify them reliably, unless there is a very precise capture and/or a very precise analysis algorithm. Similarly, when the level of degradation is very high, for example 45% or 50% (45 or 50% of the identifier pattern's cells or pixels are misread from a perfect capture, 50% signifying that there is no statistical correlation between the matrix read and the source matrix), the printed identifier patterns are almost indistinct from each other. In reality, the optimal level of degradation is close to 25%, and if the application conditions allow it, it is preferable to be close to this level. In effect, for 25% degradation, assuming that the print variations and therefore the degradations are by nature probabilistic, for each of the dots of the printed identifier pattern, the probability that it differs from the other printed identifier patterns is maximized A second analysis is given below of the error rates to be looked for when forming an image to be printed according to the printing means utilized.

It is recalled here that digital authentication codes ("DAC") are composed of various elements that take discrete values. In the case of binary values, the elements can be represented by a black (printed) or white (not printed) cell. At the time of detection, an error rate that corresponds to the rate of cells containing an incorrect value is determined. It is noted that the error rate is directly related to the ratio of signal energy to noise energy.

In order to determine how VCDPs can be generated that enable the detection of copies to be optimized, a model based on decision theory is presented below. The characteristics measured on the images (or dots) are represented by signals. In order to simplify the analysis, the hypothesis is made that the digital signals, before printing, have binary values, corresponding to characteristics that can have binary values (for example, two sizes of dots, two positions, etc.). This hypothesis is justified by the fact that most print processes process binary images. Clearly, the conclusions of the analysis can be extended to more complex cases, especially with several possible values for dot characteristics. The printing of the VCDP is modeled by adding Gaussian noise. It is also assumed that the copies are made with the same print process, such that the printing of the copy is also modeled by adding Gaussian noise of the same energy. In addition, the counterfeiter who captures the signal before printing a copy of it is forced to reconstruct a binary signal by making an estimate of the initial value that minimizes its probability of error.

This model directly corresponds to VCDPs that can have dot sizes of 1×1 pixel or 1×2 pixels (printed, for example, at 2400 dpi), for which the counterfeiter must necessarily choose one of the dot sizes in the image reconstituted from a scan, according to a measured gray scale or an estimated surface area of the dot. The model also corresponds to VCDPs with positions varying by 1 pixel, for example.

From this model, the optimal detector, the statistical distribution of the detector's values and the parameter values that maximize copy detection are derived.

The following table summarizes the different variables.

| | |
|---|---|
| s | Source signal |
| n, | Noise, copy |
| $n_c$ | noise |
| x | Signal received |

Without losing generality, the source signal is equiprobable, i.e. s[i]:{+a,−a}, for i=0, 1, ..., N−1, and a>0. The print noise follows a Gaussian distribution $N(0,\sigma^2)$.

The hypotheses of the model are summarized thus:

$$(H0) x[i]: \{+a,-a\} \quad (1)$$

$$(H1) n[i]: N(0,\sigma^2) \quad (2)$$

$$(H2) n_c[i]: N(0,\sigma^2) \quad (3)$$

Whether counterfeiters minimize their probability of error can be easily checked by restoring the signal to the closest value between +a,−a.

Consequently, the detection problem consists of distinguishing the following two hypotheses:

$$H_0: x[i] = s[i] + n[i] \quad (4)$$

$$H_1: x[i] = a.\text{sign}(s[i] + n[i]) + n_c[i] \quad (5)$$

where $H_0$ and $H_1$ are the hypotheses that the received signal is, respectively, an original and a copy.

The probability that the counterfeiter has correctly estimated the value is:

$$p(\text{sign}(s[i]+n[i])=s[i]) = p(s[i]+n[i]>0) \quad (6)$$

$$= p(N(a,\sigma^2)>0) \quad (7)$$

$$= p(N(0,1)>-a/\sigma) \quad (8)$$

$$= Q(-a/\sigma) \quad (9)$$

where $Q(x) = (2\pi)^{-1/2} \int_{-a/\sigma}^{+\infty} \exp^{-x^2/2} dx$.

The probability distributions for the signal received are as follows, where there is a mixture of two Gaussian distributions in the hypothesis $H_1$.

$$p(x; H_0) = \frac{1}{(2\pi\sigma^2)^{N/2}} \exp\left[-\frac{1}{2\sigma^2} \sum_{n=0}^{N-1} (x[n] - s[n])^2\right] \quad (10)$$

$$p(x; H_1) = (1 - Q(-a/\sigma)) \frac{1}{(2\pi\sigma^2)^{N/2}} \exp\left[-\frac{1}{2\sigma^2} \sum_{n=0}^{N-1} (x[n] + s[n])^2\right] + \quad (11)$$

$$Q(-a/\sigma) \frac{1}{(2\pi\sigma^2)^{N/2}} \exp\left[-\frac{1}{2\sigma^2} \sum_{n=0}^{N-1} (x[n] - s[n])^2\right] \quad (12)$$

Whether a simple correlator gives an optimum classification function is going to be checked. A Neyman-Pearson detector test decides $H_1$ whether the likelihood ratio exceeds a threshold t:

$$L(x) = \frac{p(x; H_1)}{p(x; H_0)} > t \quad (13)$$

The likelihood ratio is given by:

$$L(x) = Q(-a/\sigma) + (1 - Q(-a/\sigma)) \quad (14)$$

$$\exp\left[-\frac{1}{2\sigma^2} \left(\sum_{n=0}^{N-1} (x[n] + s[n])^2 + \frac{1}{2\sigma^2} \sum_{n=0}^{N-1} (x[n] - s[n])^2\right)\right]$$

Taking the logarithm and a new threshold t', the following is obtained:

$$T'(x, s) = \sum_{n=0}^{N-1} x[n]s[n] < t' \quad (15)$$

The classification function is therefore a simple correlator T', the value of which must be less than a threshold t' to classify the signal as a copy.

The statistics of T' for both hypotheses are determined. It can be assumed that T' follows a Gaussian distribution (true for N high), the means and variances of which are derived for both hypotheses:

$$E[T'; H_0] = Na^2 \quad (16)$$

$$E[T'; H_1] = Q(-a/\sigma)Na^2 - (1-Q(-a/\sigma))Na^2 = (2Q(-a/\sigma)-1)Na^2 \quad (17)$$

$$\text{Var}[T'; H_0] = Na^2\sigma^2 \quad (18)$$

$$\text{Var}[T'; H_1] = N(a^2\sigma^2 + a^4 Q(-a/\sigma)(1-Q(-a/\sigma))) \quad (19)$$

The second term of the variance for the hypothesis $H_1$, $(a^4 Q(-a/\sigma)(1-Q(-a/\sigma)))$, can be eliminated if the copies come from the same original. In practice, as counterfeiters minimize their work by only using one original to produce a large number of copies, it is reasonable to eliminate the term.

In the case in which the variances are equal, the detection performance can be characterized by the deflection coefficient $d^2$, which corresponds to the difference between the means of function T' for the two hypotheses, normalized by the variance of T':

$$d^2 = \frac{(E[T'; H_0] - E[T'; H_1])^2}{\text{Var}[T'; H_0]} \quad (22)$$

$$= \frac{2N^2 a^4 (1 - Q(-a/\sigma))^2}{Na^2 \sigma^2} \quad (23)$$

$$= \frac{2Na^2 (1 - Q(-a/\sigma))^2}{\sigma^2} \quad (24)$$

$$= 2N\gamma(1 - Q(-\sqrt{\gamma}))^2 \quad (25)$$

where $\gamma = a^2/\sigma 2$ is the square root of the signal to noise ratio.

Since the detection performance increases with the deflection coefficient, the objective is to determine the value of $\gamma$ that maximizes the expression $(\gamma(1-Q(\gamma)))^2$.

Figure 10:
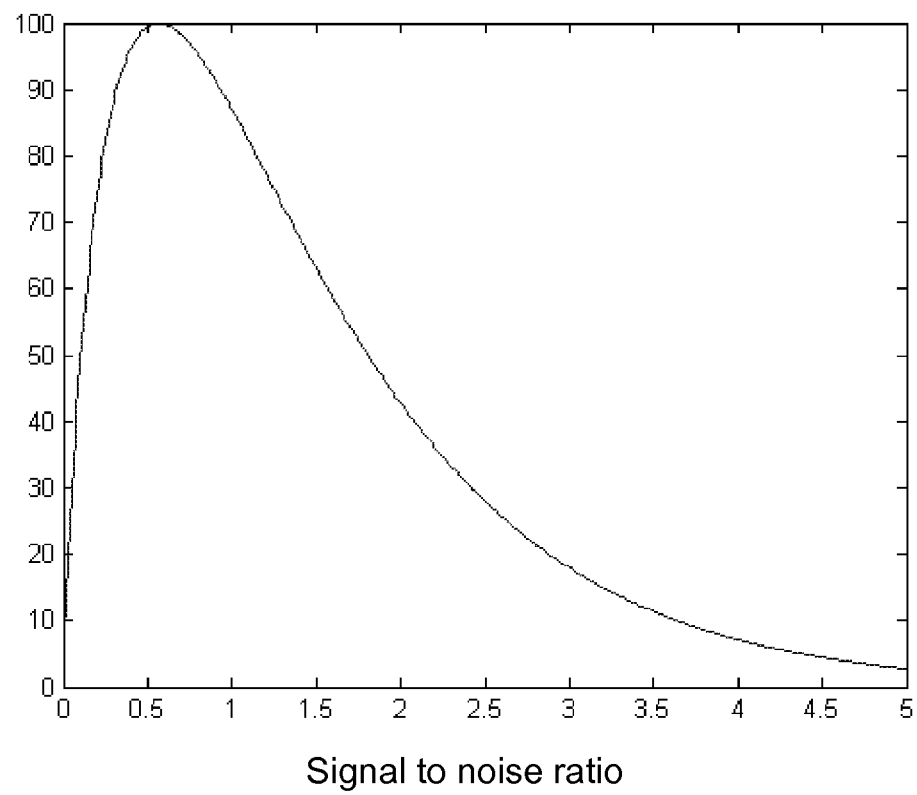
FIG. 10 shows the copy detection performance, normalized in relation to the optimal value, depending on the signal to noise ratio.

FIG. 10 shows the value of the expression of equation (25) for a fixed value of N, normalized to its optimal value and obtained as a function of $\gamma$. It can be interpreted as follows.

The values of γ close to zero correspond to a very high noise with reference to the signal: when the noise is very high, the signal is too degraded on the first print, the counterfeiter introduces a number of estimation errors that is too low. Conversely, for values of γ that are too high, the signal is not sufficiently degraded, and in too large a proportion of cases the counterfeiter does not introduce any estimation error. Between these two extremes, the expression passes through an optimum value, for which the value is numerically estimated to be γ~0.752.

It is interesting to note that, for this value, the probability that the counterfeiter has not correctly determined the value is approximately 22.6%.

In practice, it involves obtaining a signal to noise ratio $\gamma^2$ as close as possible to $0.752^2$, i.e. 0.565, while printing.

Let us take an example in order to better understand how to target this ratio value. Assume that a VCDP is generated with two possible dot sizes (expressed in number of pixels), the dot size being nine pixels (for example, 3×3 pixels). It is noted that the dot size can be measured by utilizing a large number of algorithms, for example by local adaptive thresholding for the gray scale and counting the pixels below the threshold. Dots of nine pixels are printed a sufficient number of times. In a captured image, the mean and standard deviation for each dot's number of pixels are measured. Assume that a mean of twelve is obtained (an average gain of 33% is observed), and a standard deviation of four. This standard deviation corresponds to the value σ describing the noise in the formulas for our model. A value of approximately three will therefore be aimed at for our signal a in order to obtain a ratio γ=0.75, which is very close to the optimum. In order to obtain this signal value two dot sizes of fifteen and six pixels, for example, can be defined.

Preferably, because of physical uncertainties inherent to image formation, the image formation step assigns an error rate to the representation of the digital authentication code which is higher than a first predefined value and lower than a second predefined value. For example, the first predefined value is 10% and the second predefined value is 35%.

Preferably, because of physical uncertainties inherent to image formation, the image formation step, between two formations of a same code with variable geometric areas, assigns a variation to the representation of the digital authentication code which is higher than a third predefined value and lower than a fourth predefined value. For example, the third predefined value is 2% and the fourth predefined value is 45%.

Preferably, because of physical uncertainties inherent to image formation, the image formation step assigns a noise to the representation of the digital authentication code, such that the signal to noise ratio of the representation of the digital authentication code is lower than a fifth predefined value and, preferably, higher than a sixth predefined value.

In a first example, the fifth predefined value of the signal to noise ratio is 0.05 and the sixth predefined value is 2.63, resulting in a copy detection performance of at least 25% of the optimal copy detection performance (obtained for a value of 0.56).

More preferably, the fifth predefined value of the signal to noise ratio is 0.11 and the sixth predefined value is 1.8, resulting in a copy detection performance of at least 75% of the optimal copy detection performance (obtained for a value of 0.56).

Even more preferably, the fifth predefined value of the signal to noise ratio is 0.32 and the sixth predefined value is 0.93, resulting in a copy detection performance of at least 90% of the optimal copy detection performance (obtained for a value of 0.56).

A possible algorithm for optimizing print parameters is described below:

during a step 720, the surface area available for the identifier pattern is received, for example a square measuring ⅙ inch, during a step 721, several digital images of identifier patterns are generated with different digital sizes, corresponding to various possible print resolutions, for example one identifier pattern of 66×66 pixels at 400 dots per inch, one of 100×100 pixels at 600 dots per inch, one of 133×133 pixels at 800 dots per inch, one of 200×200 pixels at 1200 dots per inch, during a step 722, each one of the identifier patterns with different digital sizes is printed several times, for example 100 times, with suitable resolution so that the dimensions of the print correspond to the surface area available.

during a step 723, for each type, each one of the printed identifier patterns is captured several times, for example 3 times, during a step 724, each identifier pattern's imprint is calculated, said imprint being a function of a degradation of the digital authentication code during the image formation step, said imprint being generally unique for each image formed because of the randomness of each individual error, during a step 725, the similarity scores are calculated for all the pairs of captured identifier patterns with the same print resolution and during a step 726, the method described in the test of the generic imprint extraction method mentioned above is followed to measure the "imprint separation degree", for each of the print resolutions, and the print resolution giving the maximum value for this degree is selected.

In a variant, several secured information matrices are printed with different print resolutions, and the print resolution resulting in a 25% error rate, as calculated with one of the algorithms described elsewhere, is determined In a variant, the print resolution is selected for which the difference between the lowest value for the score calculated on comparing imprints corresponding to identical prints, and the highest value for the score calculated on comparing imprints corresponding to different prints, is the greatest.

Figure 4:
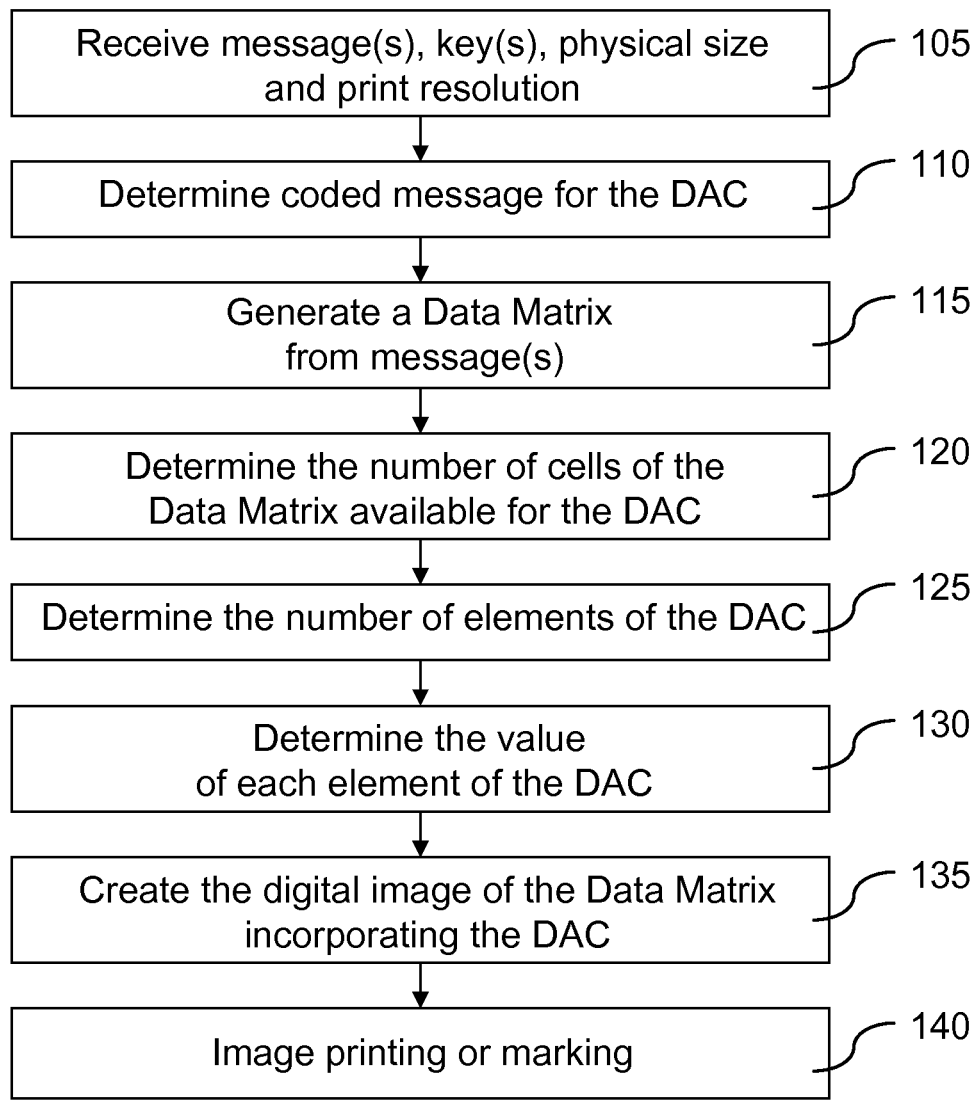
FIGS. 4 to 7 represent, in the form of logical diagrams, steps utilized in particular embodiments of the methods that are the subject of this invention.

As illustrated in FIG. 4, during a step 105, one or several messages, one or more keys, a physical size of Data Matrix and a print resolution are received.

In an optional step 110, the coded message(s) to be inserted in the DAC are determined, based on the keys and messages. In particular, the messages from the DAC can be correlated with the message represented by the Data Matrix, one of which is (partly) based on the other, to strengthen authentication.

During a step 115, a Data Matrix is generated from at least one of the messages received during step 105.

In a step 120, the number of black cells in the Data Matrix is determined, the finder patterns may or may not be included in the Data Matrix.

In a step 125, depending on the number of black cells, the print resolution and the physical size, the number of elements in the DAC is determined.

In a step 130, depending on the number of items, keys and messages the values taken by each of the DAC's elements are determined by using a DAC generation algorithm. It is noted here that the DAC generation algorithms often comprise encryption, encoding and scrambling (for example with permutations and/or substitutions) steps.

In a step 135, the digital image of the Data Matrix is created, by entering the values of the DAC in a predetermined order (e.g. left to right then top to bottom) in the pixels corresponding to the number of black cells.

In a step 140, an object is printed or marked to form the digital image of the Data Matrix incorporating the DAC.

Figure 1B:
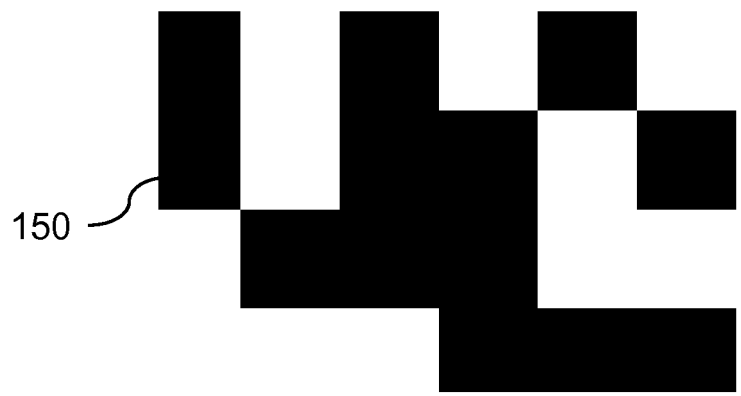
FIG. 1B shows an enlargement of the Data Matrix shown in FIG. 1A.

An example is given below, in which the Data Matrix 150 shown in FIG. 1 was generated according to a standard algorithm, based on a message. The size of the Data Matrix 150 is 26×26 cells including the finder patterns, and has 344 black cells, still including the finder patterns.

We want to print it with a printing means allowing a resolution of 600 pixels per inch (ppi), and to take up an area of 1 cm×1 cm approximately. The size in pixels of the image equivalent to 1 cm is 236×236 pixels or 236 pixels for 26 cells and 9.07 pixels/cell (in each dimension). Rounded to nine pixels per cell in each dimension, a Data Matrix size of 234 pixels×234 (because 26×9=234) is obtained, and there are 9×9=81 pixels per cell.

Since there are 344 black cells, a DAC generated over all the black cells can have 81×344=27,864 pixels. A DAC having one bit per pixel can therefore be generated, so the DAC will have 27,864 bits. The DAC is generated from the keys and messages according to known algorithms, and the values of the DAC are inserted into the black cells.

Figure 2A:
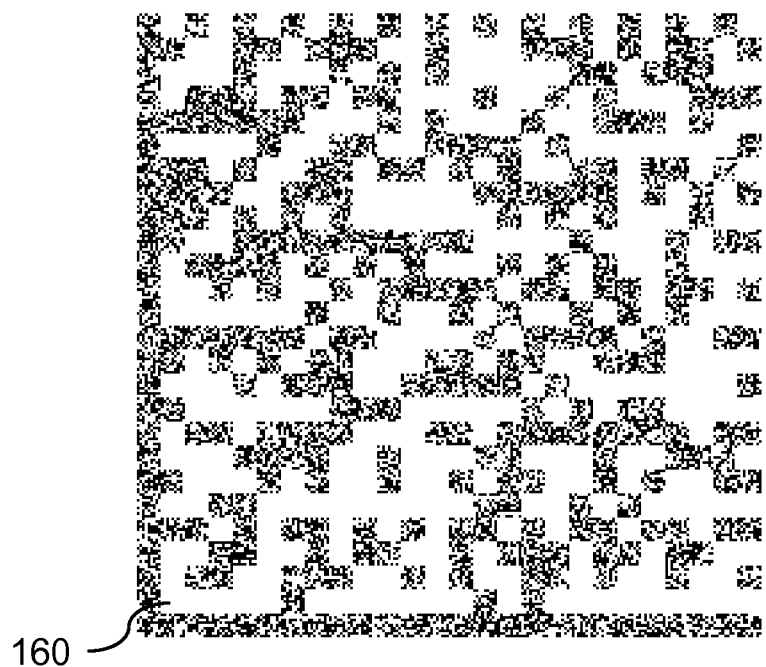
FIGS. 2A and 3A represent particular embodiments of the codes that are the subject of the present invention, enlargements of parts of these codes being shown FIGS. 2B and 3B, respectively.
Figure 2B:
Figure 3A:
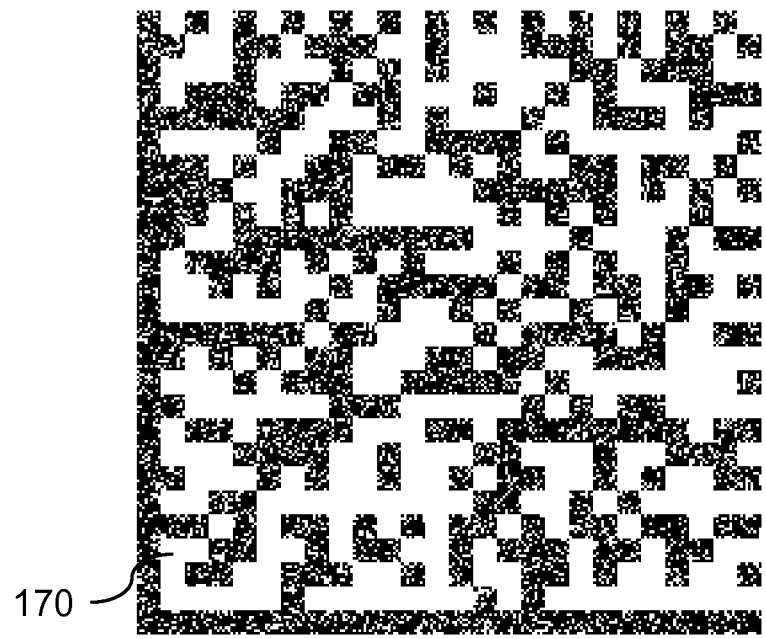
Figure 3B:

FIG. 2 shows a Data Matrix 160 that is the subject of the present invention, generated from the Data Matrix 150, in which a DAC is distributed over all the black cells. Depending on the printing means—the ink or the paper or other medium—it is possible that the quality of the Data Matrix is insufficient for decoding, for example because it has "holes" in the cells. To remedy this, in a variant, a subset of the pixels is selected from the black cells to carry the values of the DAC. For example, every other pixel is selected, the non-selected pixels remain black, giving an average of 75% black pixels per cell. There is thus a DAC of 27,864/2=13,932 bits. FIG. 3 shows such a Data Matrix 170. A subset of the pixels of black cells can also be selected based on a cryptographic key.

Preferably, the legibility of the Data Matrix is not significantly affected by the changes made. For example, the inventors have printed the Data Matrix codes 150, 160 and 170 with an office laser printer at the resolution of 600 ppi (size 1 cm.), and used the barcode verification device "TruCheck USB verifier" (registered trademark), which determines the grade of the Data Matrix. The Data Matrix 150, which serves as reference, obtained an 'A' grade, whereas the Data Matrix codes 160 and 170 achieved 'B' and 'A', respectively. Noting that the Data Matrix 160 contains more information with which to authenticate (and/or carry a message) than the Data Matrix 170, it can be seen that there may be an inverse relationship between the quality of the Data Matrix, and the amount of information contained in the DAC. The space available for the modulation of the DAC depends, in practice, on the grade acceptable for the application. In our case, if a 'B' grade is acceptable (usually grades above 'C' are acceptable), preferably the Data Matrix 160 comprising more information is selected. If only the 'A' grade is acceptable, Data Matrix 170 is selected. Otherwise, the utilization rate of the cell used is adjusted to target the minimum grade required.

Figure 9A:
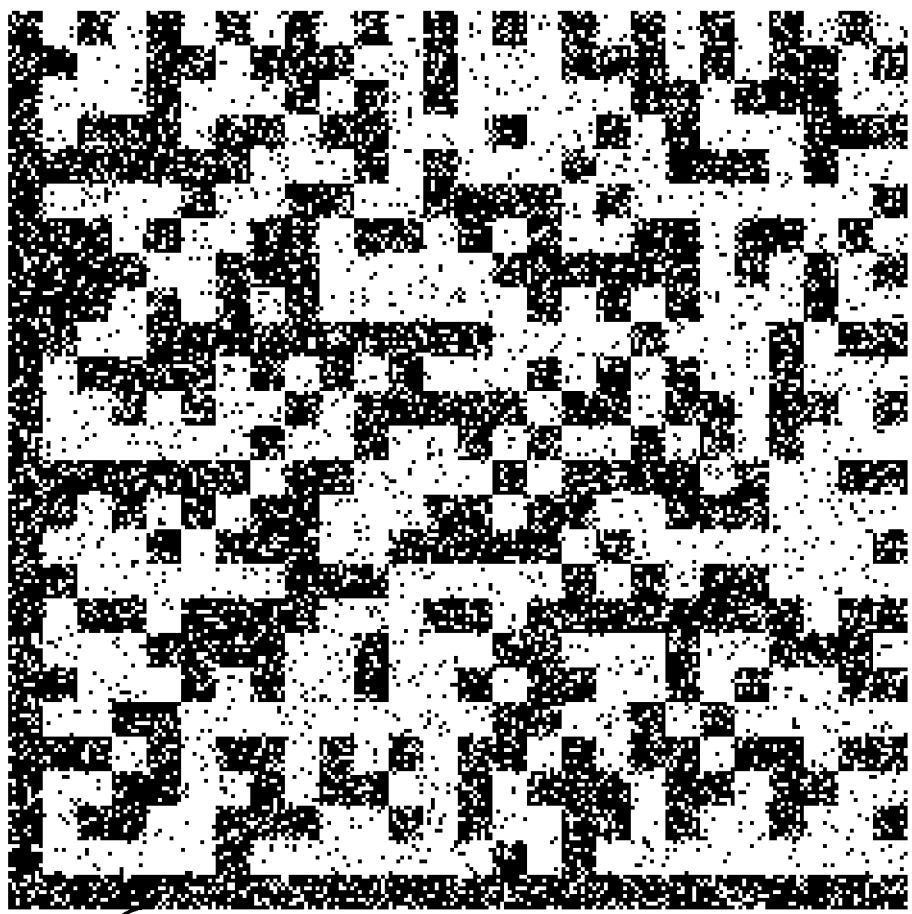
FIG. 9A shows a particular embodiment of a code that is the subject of this invention, an enlargement of a part of this code is shown in FIG. 9B
Figure 9B:
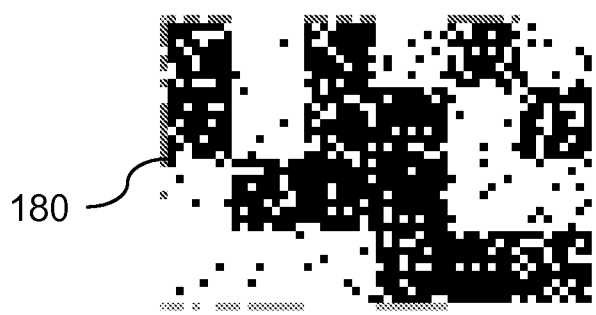

To increase the number of elements of the DAC the white (or unmarked) areas can also be used. It is then necessary to keep a low color density for the white area, so that decoding is not disrupted. For example, 20% of the pixels in the white areas can be used, preferably excluding the border of the area, which may be in contact with a black area. It is noted that if the DAC has equiprobable binary values, 10% of the pixels are black, on average, which slightly disrupts the cell's correlation rate. In our previous example, the 7×7 internal pixels of the white area would be used, 10 of them would be chosen pseudo-randomly, these ten pixels containing an element of DAC. Items can be placed only on even columns and rows, for example, to prevent them from touching. These elements can be incorporated into the DAC of black cells, or consider them as another DAC, providing another means of authentication. FIGS. 9A and 9B provide such an example 180 of Data Matrix for which the white cells also contain authenticating elements.

It is noted that the elements of this DAC can also have a variable size, for example, elements of 1×2 pixels and 1×1 pixels, to make it more difficult to identify the elements by a counterfeiter seeking to reconstruct the original DAC perfectly.

Figure 5:
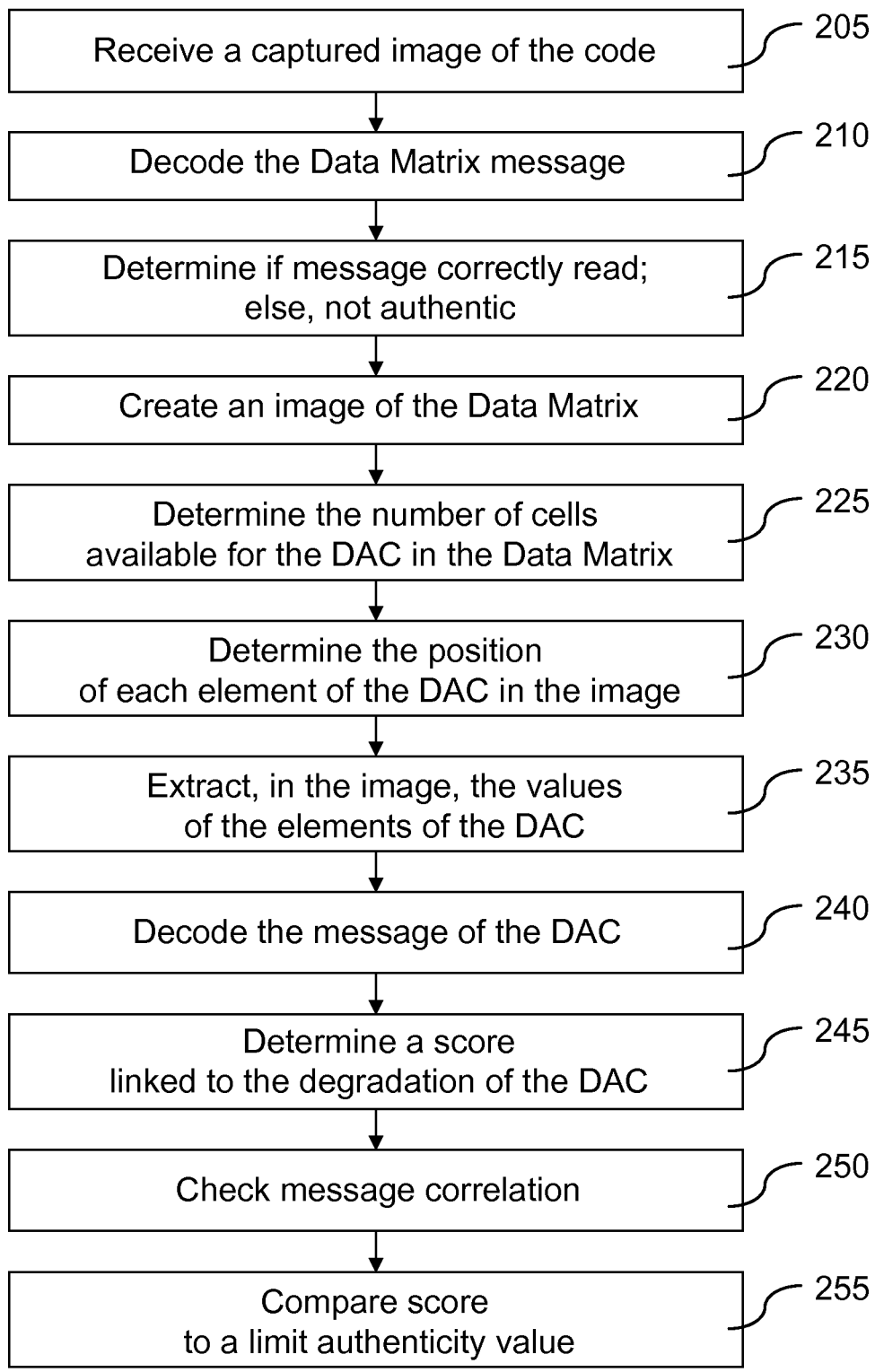

An example of an algorithm to authenticate a Data Matrix fitted with a DAC is given below, with reference to FIG. 5.

In a step 205, an image from an image capture, for example using a scanner, is received, this image containing the Data Matrix and therefore the DAC. In parallel, deciphering keys, DAC reading settings (for example, the pixel size of each cell) and a decision threshold are received.

In a step 210, the Data Matrix message carried by the mean shapes and colors of the square cells is decoded.

In a step 215, whether the Data Matrix message has been read correctly is determined, for example in relation to the incorporated ECC. Otherwise, the Data Matrix is deemed not authentic and the following is displayed to the user: "Code not authentic". If the message is read correctly, in a step 220, an image of the original Data Matrix is created.

Then, in a step 225, the number of black cells is determined, and depending on the DAC reading parameters, the number of elements of the DAC is determined In a step 230, depending on the image of the original Data Matrix and on the number of elements of the DAC, the position (in terms of pixels) in the image of each element of the DAC is determined. In a step 235, a value associated with the value of each element of the DAC is extracted from the image, for example the gray level of the pixel. This gives a data vector representative of the printed DAC and of the degradations it has undergone In a step 240, using the descrambling keys (in the case where the DAC was scrambled), the DAC message(s) are decoded.

In a step 245, the score representing the degradation rate of the DAC is determined. The score is, for example, the percentage of bits correctly determined, a correlation coefficient between the original DAC and the DAC measured from the image captured, etc.

Optionally, if the messages of the DAC and Data Matrix are correlated at the time they are created, this correlation is verified in a step 250; if they are not, "unauthenticated Data Matrix" is displayed to the user.

Finally, in a step 255 the measured score is compared to a predefined limit or "decision threshold". If it is higher, for example due to a low error rate or a high correlation rate, "Data Matrix authenticated" is displayed to the user. Otherwise, "Data Matrix unauthenticated" is displayed. Optionally, each message read is displayed.

In variants, DAC bits are reserved for synchronization, in a manner known per se.

It is noted that the same Data Matrix can be printed or marked several times in static printing (offset, flexo, etc.), or vary with every print using digital printing.

In a second embodiment, a system for laser marking and micro percussion is implemented for the integration of a DAC. Some Data Matrix marking systems, laser or micro-percussion in particular, cannot use large images as seen previously. For example, marking a 236×236 pixel image as in the above example would take far too long a time, slowing down the pace of the production line too much, or generate large Data Matrices. The particular embodiment described below is designed to avoid these disadvantages.

It is noted that several methods for realizing a Data Matrix are possible by utilizing a laser:
- a laser impact can create each cell,
- multiple juxtaposed laser impacts can create each cell, or
- a cell or clusters of cells can be vectorized and engraved by a continuous laser shot.

Moreover, it is noted that on several laser marking systems, it is possible to vary locally the following differentiation characteristics:
- the laser's power,
- the laser's polarization,
- the laser's focus on the surface to be marked,
- micro-positioning,
- the direction or the order in which points are marked by the laser and
- the shape of the wavefront.

Similarly, several methods for realizing a Data Matrix are possible micro-percussion:
- a micro tip impact can create each individual cell or
- multiple juxtaposed micro tip impacts can create each cell.

Similarly, the ability of several micro tip marking systems to vary locally the following differentiation characteristics can be used:
- force of impact,
- micro-positioning,
- the orientation of the micro tip and/or
- the shape of the micro tip.

To optimize the execution time of a Data Matrix composed of differentiated cells (according to the controllable settings of the laser or micro tip device), the cells are divided into subsets, or "classes". Each subset of cells whose differentiation characteristics are the same is realized preferably during a single pass of the tool. This allows the setting that distinguishes the marking effect to be changed only once for each subset of cells, instead of individually for each cell. Each setting that can be changed locally, and whose variation has a measurable impact on the generated Data Matrix, can be used to store information. For example, if the laser power allows two levels, one bit of information can be stored by modulating the power or another marking modulation setting. In a variant, variations on locally changeable settings can be combined.

In a variant, a setting can be locally varied quasi-continuously, and an arbitrary number of levels for storing information can be determined. For example, ten levels are implemented for said setting (color or size variations, for example) instead of the two described above, or the value of this parameter can even be changed continuously.

However, in examples of implementation, it is advantageous to use only two levels of values for the source signal. In this case, an optimal signal to noise ratio equal to 0.56 can be used, to maximize copy detection. To target this ratio, the noise properties of the channel are determined, typically using the material/means of printing pair, characterizing the distribution of the measured signal over the image capture. In the case of two energy levels, the statistical distribution of sizes of impact will be examined to determine two energy levels close enough for there to be a partial superposition of the distributions, aiming for the ideal signal noise ratio mentioned above. Specifically, if there is a standard deviation of $0.01$ mm$^2$, for a laser power of giving impact sizes of $0.10$ mm$^2$, then power levels giving mean impact sizes close to $0.1075$ mm$^2$ and $0.0925$ mm$^2$ will be selected. Indeed, a signal to noise ratio of $0.0075^2/0.01^2=0.5625$ is therefore obtained, which is very close to the theoretical optimum value.

Thus, in the case of a 26×26 cell Data Matrix of size, there are 344 laser shots. A DAC is generated in the same manner as above, and the DAC is modulated by dots $0.1075$ mm$^2$ and $0.0925$ mm$^2$ in size.

As seen above, it is checked whether the variations introduced cause a degradation of the Data Matrix inconsistent with the conditions of the application, for example a 'C' grade minimum for the Data Matrix.

In some cases, it is not possible to modulate additional information. For example, the means of printing or marking only allows marking or not marking a cell (unitary binary marking). There are also cases where the additional information marked does not offer high security against copying. For example, a means of marking allowing for predefined marking levels that remain separate from the others and clearly identifiable in the marked image allows an additional piece of information to be inserted, but it remains in principle possible to make an identical copy thereof.

In these cases, the residual noise from printing or marking can be used, and it can function as a DAC. Indeed, whatever the type of printing, at a certain scale or resolution, some "defects" appear. For example, if a laser impact leaves a circular or elliptical impact dot in principle, it is generally observed, at high enough resolution, that the shape of the point of impact is not perfectly regular. This applies even if an ink jet printing system is used. At even higher resolution, there are irregularities in the depth of the impact point, and so on.

The irregularities of the marking can be captured, measured, and used to compose a DAC. The DAC can then be stored in a database, or it can be itself stored as a 2D barcode. This last approach is however not very advantageous, since marking a second code is expensive and consumes space on the document, which is contrary to the effect sought in general. On the contrary, the DAC can be stored by combining it with the message of the Data Matrix, which, if unique (which is preferably the case), allows, during the authentication step, a simple "verification" to be made by comparing the measurement of the marking defects with the DAC. Many defect measurements are possible, for example the mean color or gray level of each cell in the Data Matrix can be measured, the contour of a cell can be determined, the distance between the center of gravity and the outer contour for different angles can be measured, etc. The impact points can overlap, in which case a limit value for the distance to the outer contour may be set.

For the print channel in question, the "average" result of marking a certain 2D barcode can be modeled on the basis of the average size of the impact points, and possibly taking into account possible interactions when the impact points are adjacent to one another. The image estimated by modeling the captured image can be subtracted and the result has less redundancy, which increases the signal to noise ratio, and at the same time, the detection performance.

Figure 6:
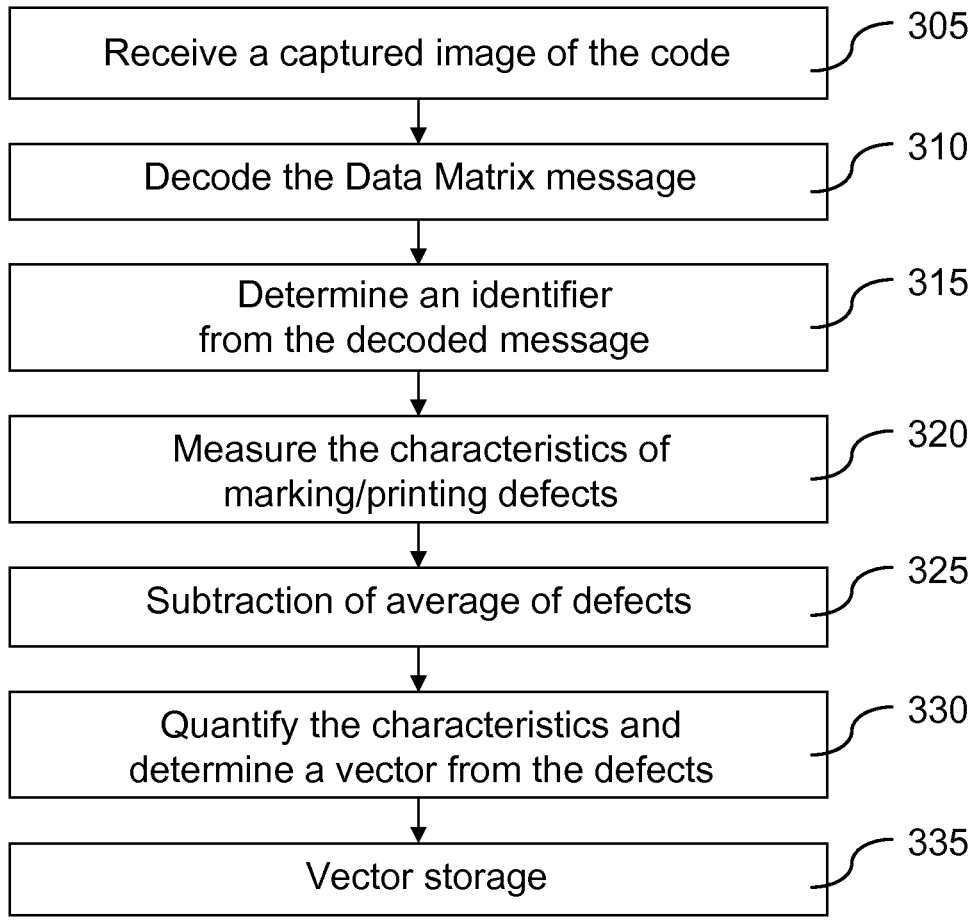

With reference to FIG. 6, an example of an algorithm for recording marking defects of a barcode is given below:

During a step 305, a captured image containing a barcode is received.

In a step 310, the barcode message carried by the mean shapes and colors of the square cells is decoded.

In a step 315, an identifier is calculated from the message.

In a step 320, the characteristics of the barcode marking defects are measured.

In an optional step 325, the average of the characteristics for a set of Data Matrix codes is subtracted from the characteristics measured for the Data Matrix in question.

In a step 330, the characteristics are quantified, possibly compressed, and a vector of characteristic data representative of defects is determined In a step 335 this vector of characteristics is stored in a database, associated with the message identifier.

Figure 7:
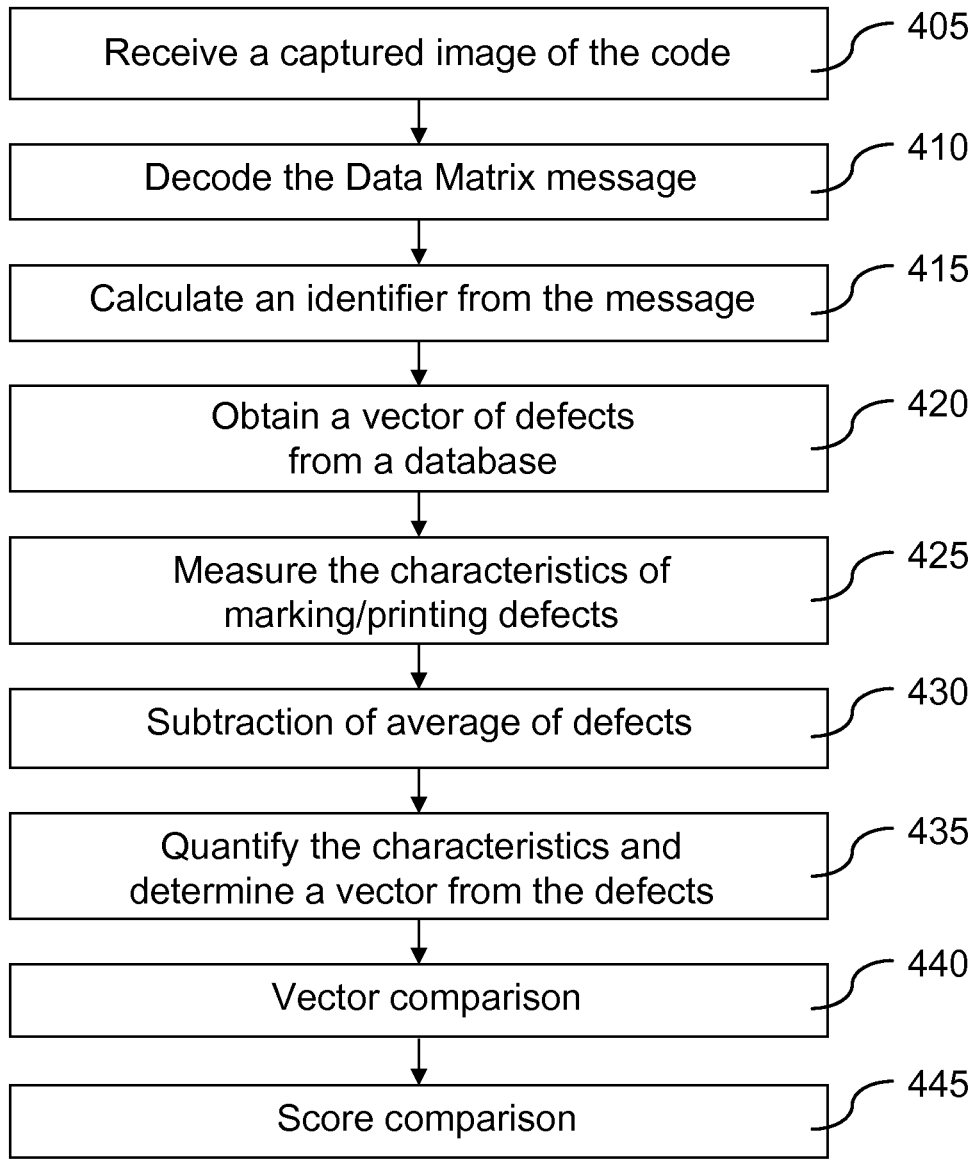

With reference to FIG. 7, an algorithm for the authentication of a 2D barcode from the measurement of marking print defects is given below:

During a step 405, a captured image containing a barcode is received.

In a step 410, the barcode message carried by the mean shapes and colors of the square cells is decoded. If it cannot be decoded, "Barcode unreadable" is displayed to the user.

Otherwise, in a step 415, an identifier is calculated from the message.

In a step 420, the data vector corresponding to this identifier is obtained from a database, as well as a decision threshold associated with this vector of characteristics. If the database does not contain this identifier, "Barcode unauthenticated" is displayed to the user.

Otherwise, in a step 425, the characteristics of the barcode marking defects are measured.

In an optional step 430, the average of the characteristics for several barcodes is subtracted from the characteristics measured for the barcode in question.

In a step 435, the characteristics are quantified, possibly compressed, and a vector of characteristic data representative of defects is determined In a step 440 the extracted data vector is compared to the data vector obtained from the database, and a similarity index, called "score" is calculated.

In a step 445 the measured score is compared to the decision threshold. If it is greater, "Data Matrix authenticated" is displayed to the user. Otherwise, "Data Matrix unauthenticated" is displayed to the user. Optionally, each message read is displayed to the user.

Figure 8:
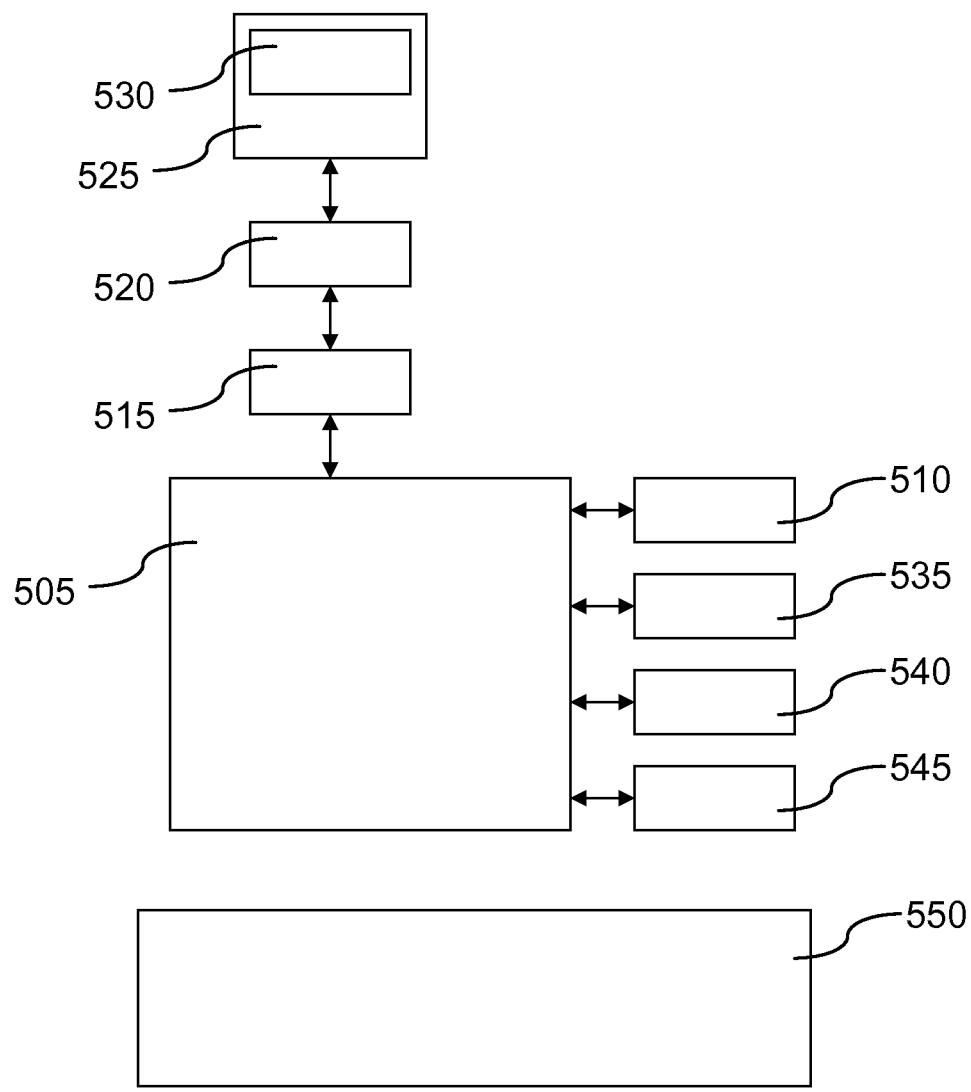
FIG. 8 represents, schematically, a particular embodiment of the device that is the subject of this invention.

FIG. 8 shows a local terminal 505, equipped with a printer 510, an image capture means 535, two sensors 540 and 545 and a means 515 of accessing a network 520, to which a server 525 is connected. The server 525 is equipped with a database 530.

The local terminal 505 is, for example, a general purpose computer. It is installed on a manufacturing or processing line 550 of objects, for example packaging. The line 550 comprises, for example, an unstacker of flat objects (not shown) and a conveyor (not shown) setting the objects to be processed in motion, one behind the other.

The sensor 540 is positioned on the manufacturing line 550, upstream of the optical field of the image sensor 535 and is designed to detect the arrival of an object to be processed. For example, the sensor 540 is an optical cell containing a transmitter and a receiver of light rays. The sensor 545 is placed on the line 550 and determines the speed of objects on this line. For example, the sensor 545 is connected to a PLC (not shown) governing the operation of the line 550 or is connected to a base for moving objects, for example, a conveyor belt. The local terminal 505 controls the printing of the objects by the printer 510, in a manner known per se, for example by ink jet or laser marking. The means 515 of access to the network 520 is, for example, a known type of modem to access the network 520, e.g. the Internet.

The image capture means 535 is, for example, a digital camera, a linear sensor or an industrial camera.

The server 525 is of a known type. The database 530 stores, at least, a list of object identifiers and of defect data vectors associated with these objects, determined in accordance with the method which is the subject of this invention. Preferably, this database 530 stores, in conjunction with each object identifier, an identifier of object type and placement position of the geometric code which is the subject of this invention for this type of object and an identifier of the provider performing the manufacture or processing.

The terminal 505 contains a program, which, during its execution, implements the steps of a method which is the subject of this invention. The terminal 525 contains a program, which, during its execution, implements the steps of a defect data vector storage and retrieval method.

In a variant, the terminal 505 does not contain specific software but uses a web browser and a web service hosted by the server 525.

The invention claimed is:

1. A method for authenticating a code with geometric areas whose shapes and/or colors vary according to a message, comprising:
   a step of generating said code with variable geometric areas, according to a message, to provide geometric areas;
   a step of generating a digital authentication code to provide numeric values;
   an image formation step in which an image of said geometric code areas is formed, comprising a part of said digital authentication code in cells formed into at least some geometric areas and/or in at least one space between geometric areas;
   wherein, in each geometric area comprising at least one cell representing a part of the digital authentication code, the area of said cell is less than a quarter of the area of said geometric area; and
   a step in which an imprint of the generated image is determined, said imprint being a function of a degradation of the digital authentication code during the image formation step.

2. The method according to claim 1, wherein, during the image formation step of said code with geometric areas comprising, in at least some of the geometric areas, a part of said digital authentication code, each part of the digital authentication code inserted into a geometric area of the code with variable geometric areas takes the form of a distribution of rectangular cells at least one order of magnitude smaller than the dimensions of said geometric area, a part of said cells having a color different from that of said geometric area.

3. The method according to claim 1, wherein, because of physical uncertainties inherent to image formation, the image formation step, between two formations of a same code with variable geometric areas, assigns a variation to the representation of the digital authentication code which is higher than a third predefined value and lower than a fourth predefined value.

4. The method according to claim 1, wherein, because of physical uncertainties inherent to image formation, the image formation step assigns an error rate to the representation of the digital authentication code which is higher than a first predefined value and lower than a second predefined value.

5. The method according to claim 1, wherein, because of physical uncertainties inherent to image formation, the image formation step assigns a noise to the representation of the digital authentication code, such that the signal to noise ratio of the representation of the digital authentication code is lower than a fifth predefined value.

6. The method according to claim 1, further comprising:
a step in which the conditions for forming said image are determined; and
a step in which the physical characteristics of cells of at least a part of the digital authentication code is determined, depending on the image formation conditions.

7. The method according to claim 1, wherein, during the step of generating said code with variable geometric areas, the variable geometric areas are generally parallel rectangular bars whose width and/or spacing varies according to said message.

8. The method according to claim 1, wherein, during the step of generating said code with variable geometric areas, the variable geometric areas are square areas inserted into a matrix whose color and/or at least one dimension vary according to said message.

9. The method according to claim 1, wherein, during the image formation step of said code with geometric areas comprising, in at least some of its geometric areas, a part of said digital authentication code, the digital authentication code takes the form of a variation of at least one dimension of the variable geometric areas.

10. The method according to claim 1, further comprising a step in which information is encoded into said digital authentication code.

11. The method according to claim 10, wherein said information is based on said message and/or said message is based on said information.

12. Method according to claim 10, wherein said information is representative of a measurement of the degradation of the digital authentication code due to physical uncertainties that affect the image during the image formation step.

13. The method according to claim 10, further comprising a step in which the degradation of the digital authentication code generated during the image formation step is measured.

14. The method according to claim 13, wherein, during the degradation measurement step, error detection codes embedded in said digital authentication code are used.

15. A device for authenticating a code with geometric areas whose shapes and/or colors vary according to a message, that comprises:
a means of generating said code with variable geometric areas, according to a message, designed to provide geometric areas,
a means of generating a digital authentication code designed to provide numeric values;
an image formation means whereby an image of said geometric code areas is formed, comprising a part of said digital authentication code in cells formed into at least some of geometric areas and/or in at least one space between geometric areas,
wherein, in each geometric area comprising at least one cell representing a part of the digital authentication code, the area of said cell is less than a quarter of the area of said geometric area; and
a determining means for determining an imprint of the generated image, said imprint being a function of a degradation of the digital authentication code due to the image formation means.

16. The device according to claim 15, wherein, the image formation means is configured so that each part of the digital authentication code inserted into a geometric area of the code with variable geometric areas takes the form of a distribution of rectangular cells at least one order of magnitude smaller than the dimensions of said geometric area, a part of said cells having a color different from that of said geometric area.

17. The device according to claim 16, wherein, the image formation means assigns a variation to the representation of the digital authentication code, between two formations of a same code with variable geometric areas, which is higher than a third predefined value and lower than a fourth predefined value because of physical uncertainties inherent to image formation.

18. The device according to claim 15, wherein the image formation means is configured to assign a variation to the representation of the digital authentication code which is higher than a third predefined value and lower than a fourth predefined value because of physical uncertainties inherent to image formation, between two formations of a same code with variable geometric areas.

19. The device according to claim 15, wherein the image formation means is configured to assign an error rate to the representation of the digital authentication code which is higher than a first predefined value and lower than a second predefined value, because of physical uncertainties inherent to image formation.

20. A printed code, comprising:
geometric areas whose shapes and/or colors vary according to a message, said geometric areas representing the message; and
a part of a digital authentication code in cells printed into at least some of the geometric areas and/or in at least one space between the geometric areas,
said digital authentication code representing numeric values;
wherein, in each geometric area comprising at least one cell representing a part of the digital authentication code, the area of said cell is less than a quarter of the area of said geometric area, and
wherein, because of physical uncertainties inherent to image formation, a printer having printed said printed code assigns, between two printings of a same code with variable geometric areas, a variation to the set of cells representing the digital authentication code which is higher than a third predefined value and lower than a fourth predefined value.

* * * * *